UNITED STATES PATENT OFFICE.

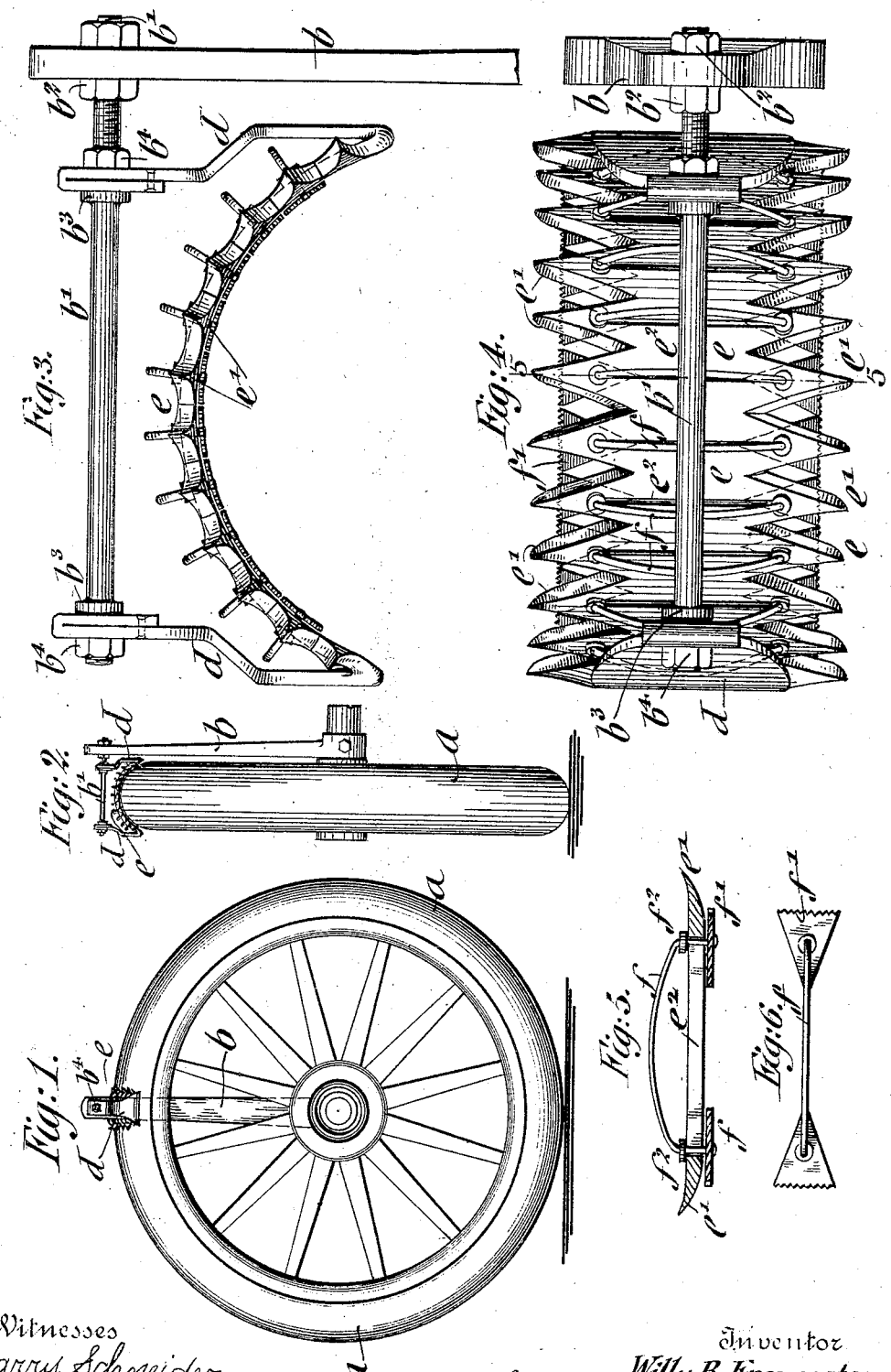

WILLY R. FROMMATER, OF NEW YORK, N. Y.

CLEARING DEVICE FOR PNEUMATIC TIRES.

No. 841,958.

Specification of Letters Patent.

Patented Jan. 22, 1907.

Application filed September 29, 1906. Serial No. 336,686.

*To all whom it may concern:*

Be it known that I, WILLY R. FROMMATER, a citizen of the Empire of Germany, residing in New York, in the borough of Manhattan, county and State of New York, have invented certain new and useful Improvements in Clearing Devices for Pneumatic Tires, of which the following is a specification.

This invention relates to an improved device for mechanically clearing pneumatic tires of automobiles, motor-cycles, and other vehicles from nails, particles of stone, and other substances by which pneumatic tires are liable to be injured, so that the tires are protected against puncturing and other injurious effects; and for this purpose the invention consists of a clearing device for pneumatic tires of automobiles, &c., which consists of an exterior curved band provided with teeth at both edges, spring-actuated clearers guided on the curved and toothed clearing-band and capable of removing any sharp articles from the surface of the tire, and means for adjustably supporting the curved and toothed clearing-band relatively to the surface of the tire, as will be fully described hereinafter, and finally pointed out in the claims.

In the accompanying drawings, Figure 1 represents a side elevation of a pneumatic tire for automobiles or other vehicles, showing my improved clearing device thereon. Fig. 2 is an end elevation of the tire-clearing device. Fig. 3 is a detail end elevation of the clearing device drawn on a larger scale. Fig. 4 is a plan view of Fig. 3. Fig. 5 is a vertical transverse section on line 5 5, Fig. 4; and Fig. 6 is a detail plan view of the serrated clearer-plates guided on the curved and toothed main clearing-plate.

Similar letters of reference indicate corresponding parts in the several figures.

Referring to the drawings, $a$ represents the pneumatic tire of an automobile, motor-cycle, or other vehicle. The clearing device is attached to a supporting-arm $b$, which is attached to the axle of the wheel, to which the tire is applied. The clearing device is attached by means of a horizontal bracket-rod $b'$, which is supported by clamping-nuts $b^2$ at the upper end of the arm $b$, the end of the bracket-rod being threaded so as to permit a lateral adjustment of the bracket-rod and the clearing device relatively to the tire with which the clearing device is to be used. The bracket-rod is provided with shoulders $b^3$, against which the supporting-arms $d$ of the clearing device are tightly clamped by means of screw-nuts $b^4$, the upper ends of the suspension-arms of the clearing device being provided with slots, so as to permit the higher or lower adjustment of the clearing device relatively to the tire. The lower ends of the suspension-rods $d$ are connected by an arc-shaped clearing-bar $e$, which is provided at both edges with tapering teeth $e'$, the edges of which are beveled so as to permit them to pass under and take up nails, sharp pieces of broken glass, small stones, &c., which adhere to the surface of the pneumatic tire $a$, and which when carried successively for a number of times around the tire would exert an injurious influence on the same and gradually puncture the tire.

The arc-shaped clearing-bar $e$ is provided with transverse slots $e^2$ for guiding the ends of springs $f$, which are riveted to small serrated clearing-plates $f'$, that are guided along the under side of the clearing-bar $e$, the springs $f$ being provided with fixed corners $f^2$ above the clearing-bar $e$, so as to retain the serrated and yielding clearing-plates along the under side of the clearing-bar. The serrated clearing-plates are spring-actuated and serve in connection with the tapering teeth of the clearing-bar to remove any nails or other sharp objects which adhere to the surface of the tire so as to remove the same. The tapering teeth of the main bar gradually pass at one or both sides of the sharp object embedded in the tire, conduct it in the gradually diminished space between the teeth while the serrated and spring-actuated plates recede under the pressure of the objects, producing the removal of the same from the tire, so that the same cannot rotate with the tire and be driven farther and farther into the circumference of the tire, so that thereby any injurious effect is obviated and puncturing or other injury to the tire prevented.

My improved clearing device can be readily stamped by suitable dies from sheet-steel and applied with great facility to the tires of automobiles, motor-cycles, and the like, so as to protect by a comparatively inexpensive guard device the expensive tires against puncturing and other injury by sharp objects which are taken up by the tires and which would otherwise be the cause of damaging and gradually destroying the tires.

Having thus described my invention, I claim as new and desire to secure by Letters Patent—

1. A clearing device for pneumatic tires for automobiles and other vehicles, which comprises an arc-shaped clearing-bar provided with teeth at both sides, means for suspending said clearing-bar in proximity to the tire, and serrated and spring-actuated clearing-plates guided below the teeth of the main clearing-bar.

2. A clearing device for pneumatic tires for automobiles and other vehicles, which comprises a stationary arc-shaped clearing-bar provided with beveled teeth at both edges, means for suspending said clearing-bar in proximity to the upper part of the tire, a number of serrated and spring-actuated plates arranged below the teeth of the main clearing-bar, and springs connecting said clearing-plates in pairs, said springs extending through slots of the clearing-bar.

3. In a clearing device for tires of automobiles and the like, the combination, with a suspension-arm attached to the axle, of an adjustable bracket-rod on said arm, adjustable suspension-arms applied to said bracket-rod, means for attaching said suspension-arms to the bracket-rod, an arc-shaped clearing-bar connecting the lower ends of said suspension-arms, said bar being provided with teeth at both edges, and spring-actuated clearing-plates guided along the teeth of the stationary clearing-bar.

In testimony that I claim the foregoing as my invention I have signed my name in presence of two subscribing witnesses.

WILLY R. FROMMATER.

Witnesses:
PAUL GOEPEL,
HENRY J. SUHRBIER.